(12) United States Patent
Minato

(10) Patent No.: US 9,667,482 B2
(45) Date of Patent: May 30, 2017

(54) COMMUNICATION APPARATUS AND COMMUNICATION METHOD

(71) Applicant: FUJITSU LIMITED, Kawasaki-shi, Kanagawa (JP)

(72) Inventor: Kenji Minato, Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/696,697

(22) Filed: Apr. 27, 2015

(65) Prior Publication Data

US 2015/0381496 A1  Dec. 31, 2015

(30) Foreign Application Priority Data

Jun. 26, 2014 (JP) ................. 2014-131739

(51) Int. Cl.
| | |
|---|---|
| H04L 12/801 | (2013.01) |
| H04L 12/24 | (2006.01) |
| H04L 12/803 | (2013.01) |
| H04L 12/721 | (2013.01) |
| H04L 12/707 | (2013.01) |

(52) U.S. Cl.
CPC ........ *H04L 41/0803* (2013.01); *H04L 47/125* (2013.01); *H04L 47/127* (2013.01); *H04L 45/24* (2013.01); *H04L 45/66* (2013.01)

(58) Field of Classification Search
None
See application file for complete search history.

(56) References Cited

U.S. PATENT DOCUMENTS

| | | | | |
|---|---|---|---|---|
| 6,122,254 A * | 9/2000 | Aydemir | ................. | H04L 47/10 370/235 |
| 6,324,165 B1 | 11/2001 | Fan et al. | | |
| 6,744,767 B1 * | 6/2004 | Chiu | ................... | H04L 12/5693 370/231 |
| 7,243,258 B2 * | 7/2007 | Ichinohe | ............. | H04L 41/0213 709/224 |
| 2006/0215552 A1 * | 9/2006 | Iwata | ..................... | H04L 12/24 370/229 |

FOREIGN PATENT DOCUMENTS

| | | |
|---|---|---|
| JP | 11-88374 | 3/1999 |
| JP | 2002-44147 | 2/2002 |
| JP | 2004-159009 | 6/2004 |

* cited by examiner

*Primary Examiner* — Chi H Pham
*Assistant Examiner* — Shick Hom
(74) *Attorney, Agent, or Firm* — Staas & Halsey LLP

(57) ABSTRACT

A communication apparatus includes: a detection unit to detect a change in a port state of a physical path; a calculation unit to calculate a predicted amount of traffic to be allocated to the physical path for each of classes prioritized with predefined priorities within the traffic when the change in the port state is detected, and to calculate a bandwidth allocation ratio to a physical bandwidth of the physical path, for each of the classes to be allocated for the physical path according to the calculated predicted amount of traffic for each of the classes; a setting unit to set the calculated bandwidth allocation ratio for each of the classes; and a control unit to control a flow rate of the traffic for each of the classes to be flowed in the physical path according to the set bandwidth allocation ratio for each of the classes.

7 Claims, 11 Drawing Sheets

| TC TYPE | PRIORITY |
|---|---|
| TC0 | NORMAL |
| TC1 | NORMAL |
| TC2 | NORMAL |
| TC3 | HIGH |
| TC4 | HIGH |
| TC5 | HIGH |
| TC6 | HIGH |
| TC7 | HIGHEST |

| USER | PREDICTED TRAFFIC AMOUNT (UNIT: Mbytes/sec) | | | | | | | |
|---|---|---|---|---|---|---|---|---|
|  | TC0 | TC1 | TC2 | TC3 | TC4 | TC5 | TC6 | TC7 |
| USER A(VLAN ID=1) | 150 | 50 | 50 |  |  |  |  | 50 |
| USER B(VLAN ID=2) |  |  |  | 100 | 50 | 50 |  |  |
| USER C(VLAN ID=3) |  |  |  | 100 | 100 | 100 |  | 100 |
| USER D(VLAN ID=4) | 50 |  |  | 300 | 100 | 100 |  | 50 |

FIG.6A

| USER | TC0 | TC1 | TC2 | TC3 | TC4 | TC5 | TC6 | TC7 | Total |
|---|---|---|---|---|---|---|---|---|---|
| USER A(VLAN ID=1) | 150 | 50 | 50 | | | | | 50 | 300 |
| USER B(VLAN ID=2) | | | | 100 | 50 | 50 | | | 200 |
| Total | 150 | 50 | 50 | 100 | 50 | 50 | | 50 | 500 |

(UNIT: Mbytes/sec)

FIG.6B

| USER | TC0 | TC1 | TC2 | TC3 | TC4 | TC5 | TC6 | TC7 | Total |
|---|---|---|---|---|---|---|---|---|---|
| USER C(VLAN ID=3) | | | | 100 | 100 | 100 | | 100 | 400 |
| USER D(VLAN ID=4) | 50 | | | 300 | 100 | 100 | | 50 | 600 |
| Total | 50 | | | 400 | 200 | 200 | | 150 | 1000 |

(UNIT: Mbytes/sec)

FIG.7A

| TC0 | TC1 | TC2 | TC3 | TC4 | TC5 | TC6 | TC7 |
|-----|-----|-----|-----|-----|-----|-----|-----|
| 30 | 10 | 10 | 20 | 10 | 10 | 0 | 10 |

(UNIT: %)

FIG.7B

| TC0 | TC1 | TC2 | TC3 | TC4 | TC5 | TC6 | TC7 |
|-----|-----|-----|-----|-----|-----|-----|-----|
| 5 | 0 | 0 | 40 | 20 | 20 | 10 | 15 |

(UNIT: %)

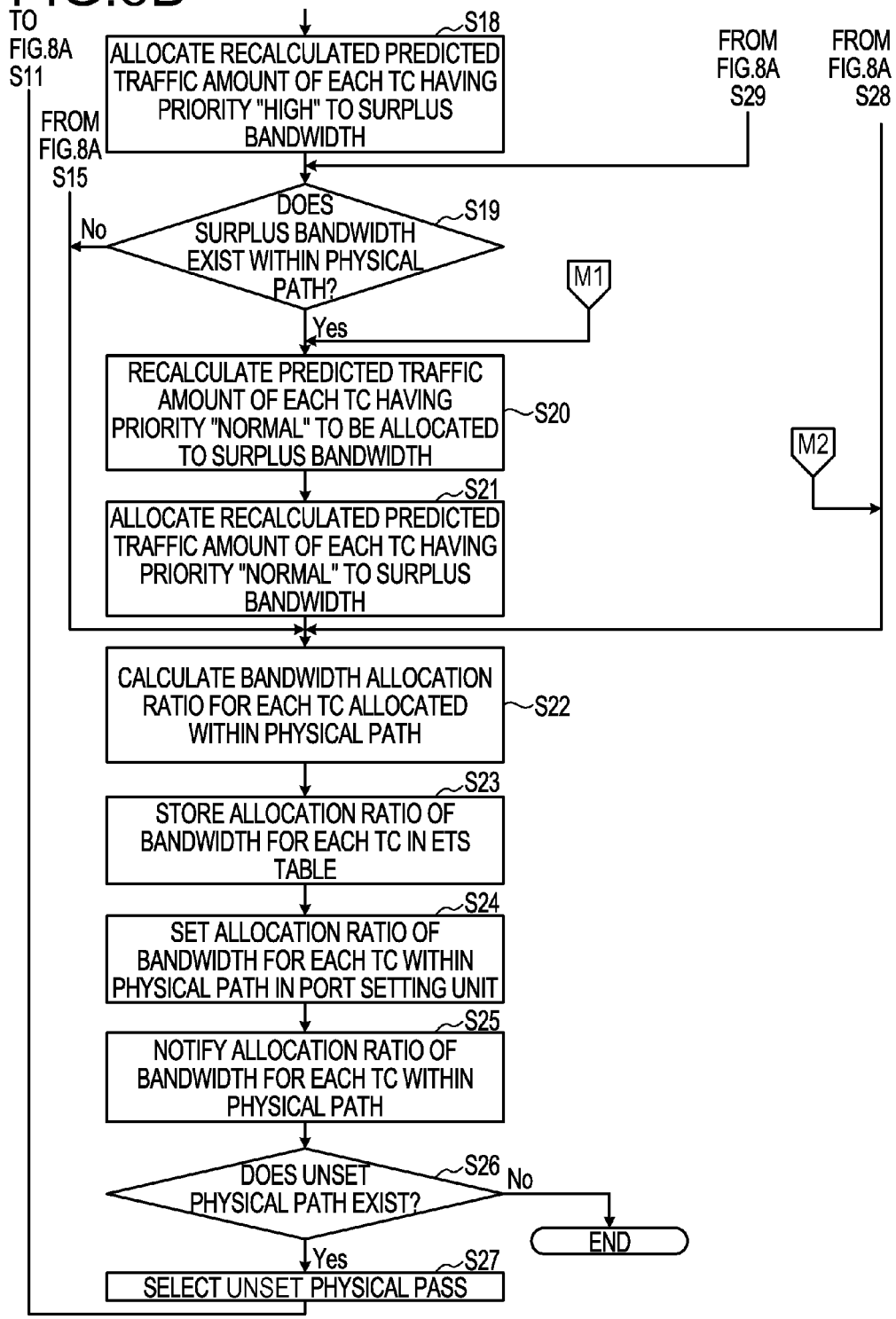

FIG.10

| USER | TC0 | TC1 | TC2 | TC3 | TC4 | TC5 | TC6 | TC7 | Total |
|---|---|---|---|---|---|---|---|---|---|
| USER A(VLAN ID=1) | 150 | 50 | 50 |  |  |  |  | 50 | 300 |
| USER B(VLAN ID=2) |  |  |  | 100 | 50 | 50 |  |  | 200 |
| USER C(VLAN ID=3) |  |  |  | 100 | 100 | 100 |  | 100 | 400 |
| USER D(VLAN ID=4) | 50 |  |  | 300 | 100 | 100 |  | 50 | 600 |
| Total | 200 | 50 | 50 | 500 | 250 | 250 |  | 200 | 1500 |

(UNIT: Mbytes/sec)

FIG.11

| USER | TC0 | TC1 | TC2 | TC3 | TC4 | TC5 | TC6 | TC7 | Total |
|---|---|---|---|---|---|---|---|---|---|
| Total |  |  |  | 400 | 200 | 200 |  | 200 | 1000 |

(UNIT: Mbytes/sec)

COMMUNICATION APPARATUS AND COMMUNICATION METHOD

CROSS-REFERENCE TO RELATED APPLICATION

This application is based upon and claims the benefit of priority from the prior Japanese Patent Application No. 2014-131739 filed on Jun. 26, 2014, the entire contents of which are incorporated herein by reference.

FIELD

The embodiments discussed herein are related to a communication apparatus and a communication method.

BACKGROUND

A communication apparatus located within a general communication network equipped with a Layer 2 redundancy employs a STP (Spanning Tree Protocol) to form a blocking port in order to avoid loops in packet transfer. However, in the communication apparatus employed with the STP, since a path connected to the blocking port becomes unavailable while the loops may be avoided, an available bandwidth of the communication apparatus is unable to be effectively utilized.

Accordingly, TRILL (Transparent Interconnection of Lots of Links) which is a Layer 2 redundancy protocol is defined in RFC 6325 as a standard. TRILL is a technology which makes paths in a communication network, for example, Ethernet (registered trademark) redundant. Furthermore, since TRILL has architecture capable of avoiding loops in data transfer without forming the blocking port, more effective utilization of the available bandwidth may be achieved in TRILL than in STP.

TRILL may adapt an IS-IS (Intermediate System to Intermediate System) which is a Layer 3 routing protocol to Layer 2 to rapidly switch from an active path to a redundant path such as, for example, in the case where a fault occurs on the active path. The communication apparatus equipped with an L2 switch function which corresponds to TRILL has a function of determining the shortest path among physical paths within a TRILL network constituted with a plurality of communication apparatuses using a SPF (Shortest Path First) method.

Furthermore, since respective communication apparatuses of the TRILL network perceive the costs of respective physical paths within the TRILL network, the communication apparatus is also equipped with a function of autonomously switching from an active physical path to a least cost redundant path among a plurality of redundant paths that are able to allocate in a case where the active physical path within the TRILL network becomes unavailable due to, for example, a fault.

Further, a DCB (Data Center Bridging) of Ethernet extensions is known which intends to be used mainly in data centers and implements, for example, a lossless packet. In the meantime, the DCB is stipulated by IEEE (Institute of Electrical and Electronics Engineers).

Further, the DCB includes an ETS (Enhanced Transmission Selection) function. The ETS function is a protocol capable of classifying traffic into TCs (Traffic Classes) prioritized with a defined priority and designating an allocation ratio of the minimum guaranteed bandwidth for each TC to a physical bandwidth of a physical path (see, e.g., IEEE 802.1Qaz). Further, the TC corresponds to a category of traffics grouped based on similarity of traffic. The TC is allocated to a value of a PCP (Priority Code Point) field within a frame of traffic. The PCP field corresponds to a 3-bit field which designates a priority level defined in IEEE802.1p and indicates the priority level of the frame by 0 to 7 to assign the priority level to various traffics such as, for example, voice, moving picture or data. Accordingly, a higher priority TC is allocated to a packet of traffic such as, for example, storage I/O, for which the lossless packet is required such that the packet of traffic is preferentially allocated to the physical path, thereby achieving the lossless packet.

That is, the ETS function may be referred to as architecture that guarantees an allocatable minimum bandwidth for each TC among bandwidths of traffic to be allocated to the physical path and at least the minimum bandwidth is allowed to be allocated to a lower priority traffic to implement a bandwidth guaranty per TC unit.

Next, descriptions will be made on an example of setting of the ETS in detail. The traffic to be allocated to the physical path are classified into, for example, TC1, TC2, and TC3, and a predicted traffic amount of TC1 is set to 100 Mbytes/sec, a predicted traffic amount of TC2 is set to 200 Mbytes/sec, and a predicted traffic amount of TC3 is set to 100 Mbytes/sec. Further, the physical path is 1 GB line which provides 1 Gbytes/sec as the maximum traffic amount. ETS allocates 25% of a bandwidth allocation ratio for TC1 with respect to the physical bandwidth of the physical path, 50% for TC2, and 25% for TC3 according to the predicted traffic amount of each TC of the traffic to be allocated to the physical path. As a result, a traffic amount of a bandwidth for TC1 is guaranteed up to 250 Mbytes/sec, a traffic amount of a bandwidth for TC2 is guaranteed up to 500 Mbytes/sec, and a traffic amount of a bandwidth for TC3 is guaranteed up to 250 Mbytes/sec. In the meantime, the setting contents of the ETS, that is, the bandwidth allocation ratios for respective TCs are not changed as long as a user does not set and change the setting contents.

Further, in recent years, it is also being considered that the DCB and TRILL are used together to construct a robust communication network to be utilized in FCoE (Fibre Channel over Ethernet (registered trademark)) for consolidating such as, for example, a storage I/O for which the lossless packet is required.

A related technique is disclosed in, for example, Japanese Laid-Open Patent Publication No. 2002-44147.

SUMMARY

According to an aspect of the invention, a communication apparatus that forms a communication network applying a Layer 2 redundancy protocol includes: a detection unit configured to detect a change in a port state of a physical path within the redundancy protocol; a first calculation unit configured to calculate a predicted amount of traffic to be allocated to the physical path for each of classes prioritized with predefined priorities within the traffic when the change in the port state is detected; a second calculation unit configured to calculate a bandwidth allocation ratio to a physical bandwidth of the physical path, for each of the classes to be allocated for the physical path according to the calculated predicted amount of traffic for each of the classes; a setting unit configured to set the bandwidth allocation ratio for each of the classes calculated by the second calculation unit; and a control unit configured to control a flow rate of the traffic for each of the classes to be flowed in the physical path according to the set bandwidth allocation ratio for each of the classes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A and FIG. 6B are diagrams for explaining an example of a table per path;

FIG. 7A and FIG. 7B are diagrams for explaining an example of an ETS table;

FIG. 8A and FIG. 8B are a flowchart illustrating an example of processing operations of a DCB control unit related to an ETS setting process;

FIG. 10 is a diagram for explaining an example of the table per user when a path is switched;

FIG. 11 is a diagram for explaining an example of the table per path after recalculation according to a priority is performed.

DESCRIPTION OF EMBODIMENTS

In TRILL, when a path is switched from an active path to a redundant path due to an occurrence of, for example, a fault in the active path, a traffic amount of each TC of traffic to be allocated to each path or a bandwidth allocation ratio for each TC is greatly varied. However, when the traffic amount of each TC to be allocated to each path exceeds a bandwidth allocation ratio set in the ETS, packets which correspond to a portion of the traffic amount exceeding the allocation ratio are discarded. For example, when the traffic of which an amount exceeds the bandwidth allocation ratio for the TC having a higher priority is flowed into the TRILL network, a packet having the higher priority which is in association with the TC is discarded, which causes an occurrence of, for example, a packet loss or congestion.

That is, even when the path is autonomously switched in TRILL, the setting contents of the ETS, that is, the bandwidth allocation ratio for each TC of each physical path is not automatically updated. Accordingly, when the traffic of which an amount exceeds the bandwidth allocation ratio for each TC is flowed, the packet having the higher priority is lost or a congestion occurs.

Hereinafter, embodiments of a communication apparatus, a communication system, and a communication method that are capable of achieving a lossless packet within traffic will be described with reference to accompanying drawings in detail. In the meantime, the present disclosure is not limited to respective embodiments. Further, respective embodiments described in the following may be appropriately combined without being inconsistent with each other.

Figure 1:
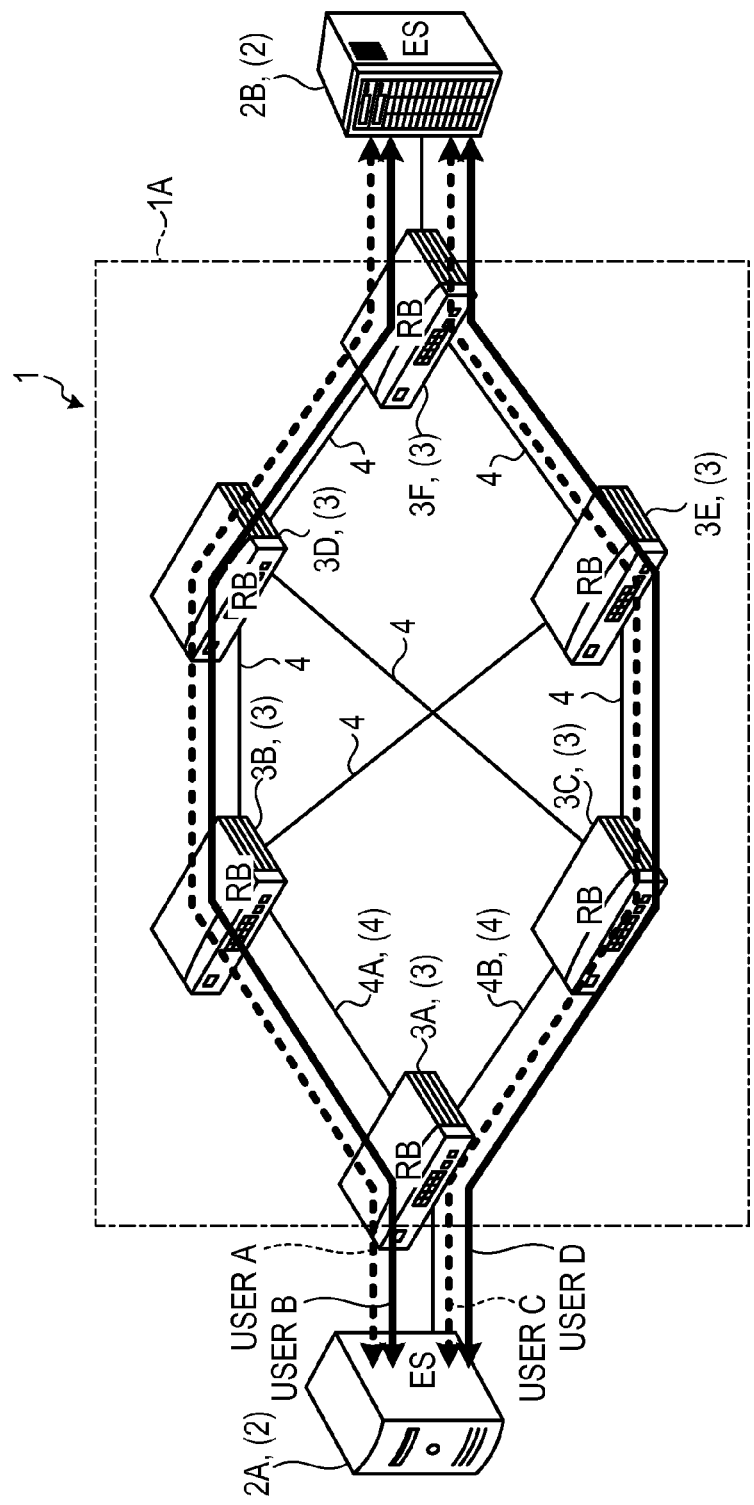
FIG. 1 is a diagram for explaining an exemplary communication system of the present embodiment.

FIG. 1 is a diagram for explaining an example of a communication system 1 of the present embodiment. The communication system 1 illustrated in FIG. 1 includes, for example, two ESs (End Stations) 2 within a communication network such as Ethernet (registered trademark) and a TRILL network 1A in which the Layer 2 redundancy is secured between two ESs 2. The ES 2 is an equipment, such as, for example, a personal computer, a server or a storage.

The TRILL network 1A includes, for example, six RBs (Routing Bridges) 3. The RB 3 is a communication apparatus equipped with, for example, a L2 switch having installed a TRILL protocol function therein. The RB 3 includes two terminating RBs 3A and 3F and four relaying RBs 3B, 3C, 3D, and 3E. The terminating RB 3A is disposed at a boundary between the TRILL network 1A and a communication network which differs from the TRILL network 1A and accommodates an ES 2A. The terminating RB 3A is a terminating apparatus of the TRILL network 1A side Ingress, which is connected to the ES 2A. The terminating RB 3F is disposed at a boundary between the TRILL network 1A and a communication network which accommodates an opposing side ES 2B. The terminating RB 3F is a terminating apparatus of the TRILL network 1A side Egress, which is connected to the opposing side ES 2B.

The relaying RBs 3B, 3C, 3D, and 3E are relay apparatuses, which are disposed on a physical path 4 which connects the terminating RB 3A and terminating RB 3F, within the TRILL network 1A. The relaying RBs 3B, 3C, 3D, and 3E are responsible for transmitting TRILL frames within the TRILL network 1A. Since each relaying RB 3 is typically connected in redundancy, each relaying RB 3 controls output destination paths to be allocated in order that the TRILL frames are distributed to prevent loads from being concentrated on a specific redundant path among a plurality of redundant paths within the physical path 4. The physical path 4 which connects the RBs 3 with each other within the TRILL network 1A is assumed as, for example, 1 GB line, for the convenience of explanation.

The ES 2A illustrated in FIG. 1 is connected with the opposing side ES 2B through the TRILL network 1A. The ES 2A is connected with the terminating RB 3A of the TRILL network 1A side. The opposing side ES 2B is connected with the terminating RB 3F of the TRILL network 1A side. The ES 2A transmits a communication frame to the terminating RB 3A in order to transmit the communication frame to the opposing side ES 2B. The terminating RB 3A encapsulates the communication frame by adding a TRILL header thereto and transmits the encapsulated TRILL frame to the opposing side terminating RB 3F via the relaying RB 3 on the physical path 4 within the TRIIL network 1A.

The opposing side terminating RB 3F receives the encapsulated TRILL frame and decapsulates the TRILL frame by removing the TRILL header from the TRILL frame and transmits the decapsulated communication frame to the opposing side ES 2B. Accordingly, a user of the ES 2 side transparently utilizes the TRILL network 1A without considering an internal configuration of the TRILL network 1A and thus, the TRILL network 1A itself is viewed by the user as an image of a single logical L2 switch.

Each RB 3 within the TRILL network 1A exchanges a TRILL HELLO frame with an adjacent RB 3 to autonomously recognize an adjacency relationship therebetween. Further, each RB 3 exchanges an LSP (Link State Packet) frame with an adjacent RB 3 to share the same topology information such as an adjacency relationship and path cost to enable the TRILL frame to be routed in the shortest path (least path cost).

Figure 2:
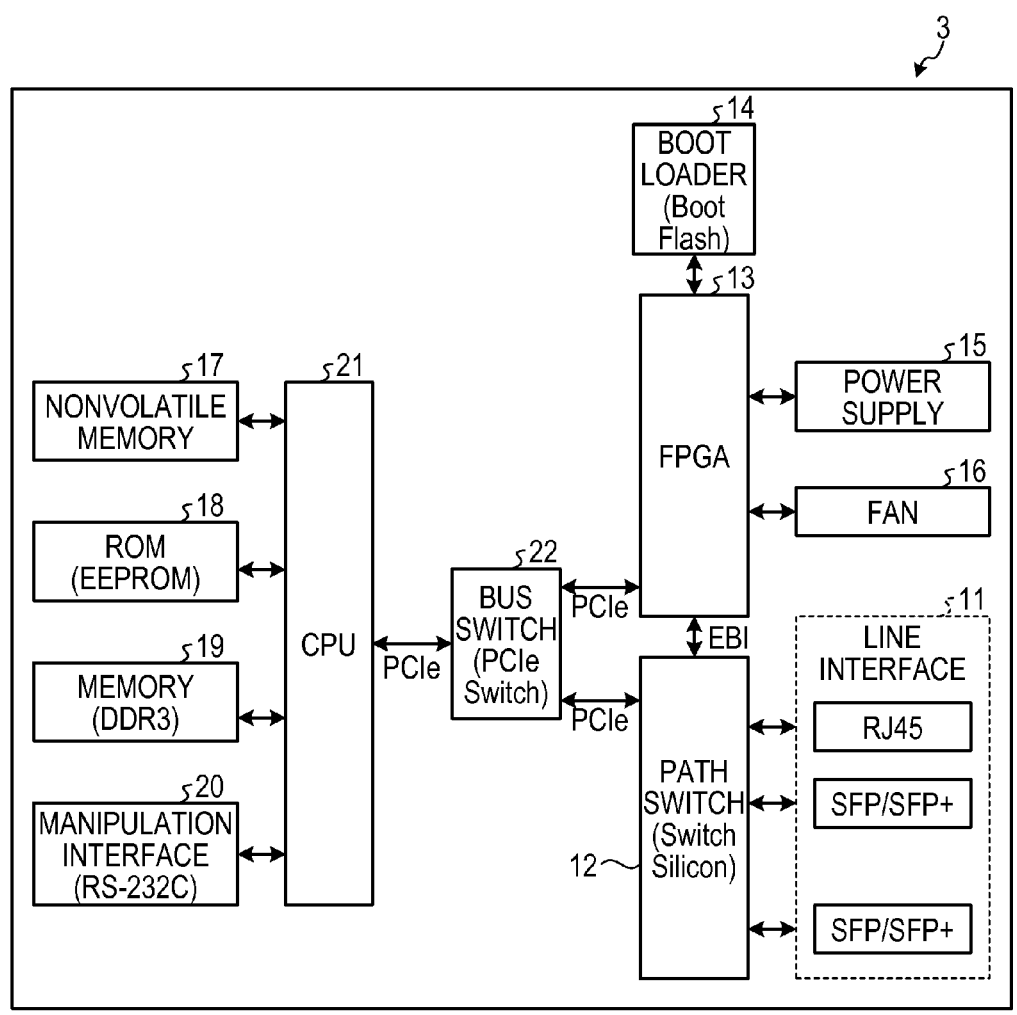
FIG. 2 is a block diagram illustrating an example of an internal hardware configuration of a Routing Bridge (RB) of the present embodiment.

FIG. 2 is a block diagram illustrating an example of an internal hardware configuration of an RB 3 of the present embodiment. The RB 3 illustrated in FIG. 2 includes a line interface 11, a path switch 12, an FPGA (Field Programmable Gate Array) 13, a boot loader 14, a power supply 15, and a FAN 16. The RB 3 includes a non-volatile memory 17, a ROM (Read Only Memory) 18, a memory 19, a manipulation interface 20, a CPU (Central Processing Unit) 21, and a bus switch 22.

The line interface 11 is connected with the physical path 4 and corresponds to, for example, RJ45 stipulated in the Registered Jack specification or a communication port stipulated in the SFP (Small Form-Factor Pluggable) specification. The path switch 12 is, for example, Switch Silicon and is connected to the physical path 4 which becomes connected to the communication port within the line interface 11 due to switching of the communication port. The FPGA 13 is an integrated circuit which allows, for example, the configuration information, to be set and changed. The boot loader 14 is, for example, a Boot Flash for activating a changed program at the time of setting and changing the configuration information within the FPGA 13. The power supply 15 is a unit which supplies electric power to the entire RB 3. The FAN 16 is an air conditioning equipment which cools down the equipments within the RB 3. The nonvolatile memory 17 corresponds to a storage region where various information, such as a program, is stored. The ROM 18 is, for example, an EEPROM (Electrically Erasable Programmable Read Only Memory) in which various setting information are stored. The memory 19 is, for example, a SDRAM (Synchronous Dynamic Random Access Memory) of DDR3 (Double-Data-Rate 3) which stores various information such as topology information.

The manipulation interface 20 is, for example, an RS-232C interface, and corresponds to an interface for changing and setting contents within the RB 3 by being connected with a console terminal. The CPU 21 is a central processing apparatus which controls the entire RB 3. The bus switch 22 is, for example, a PCIe (Peripheral Component Interconnect-express) Switch, which connects the CPU 21 with the FPGA 13, the CPU 21 and the path switch 12 by switching bus lines for the connections between the CPU 21 and the FPGA 13 and between the CPU 21 and the path switch 12. The FPGA 13 and the path switch 12 are connected with each other by an EBI (External Bus Interface).

Figure 3:
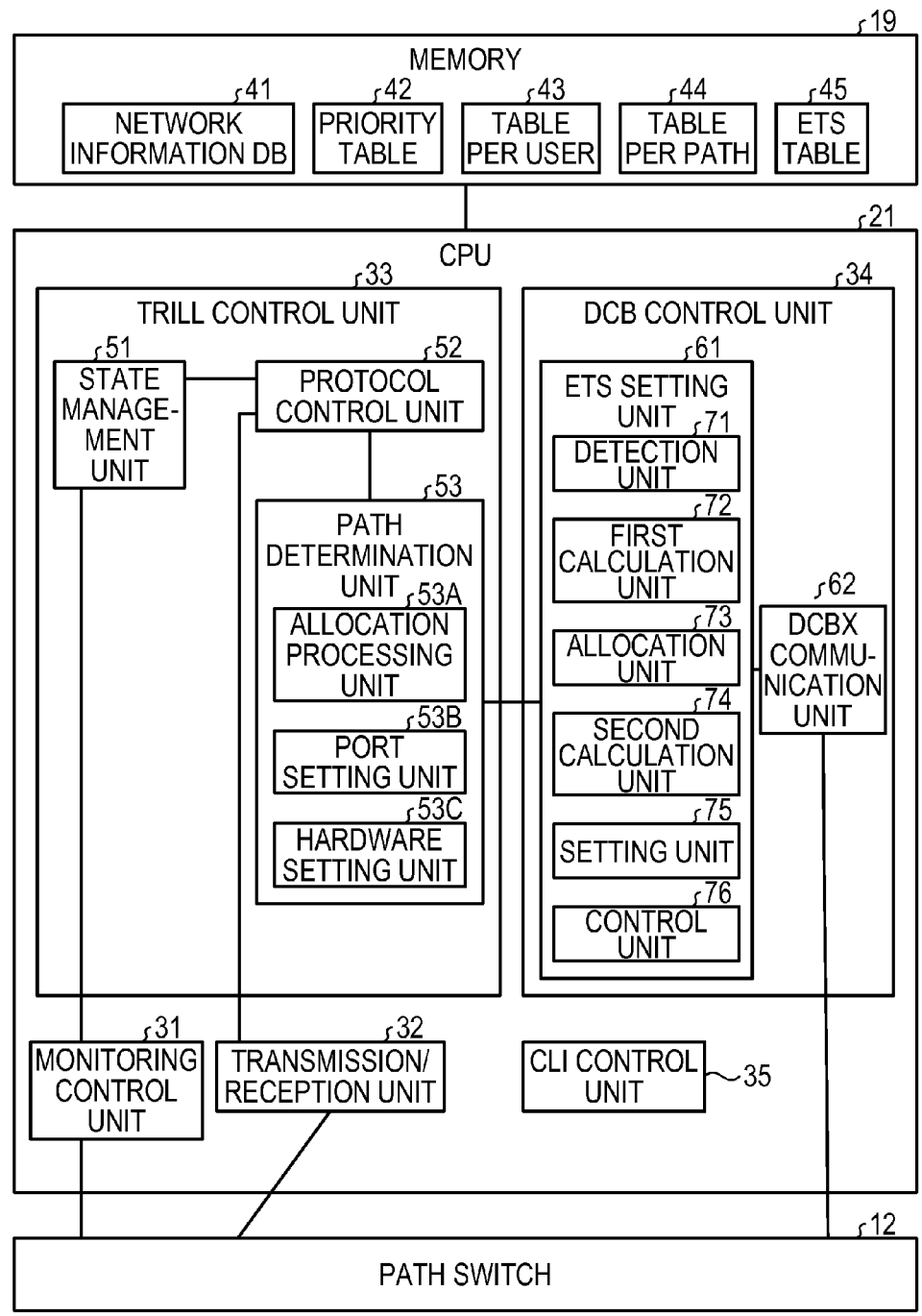
FIG. 3 is a block diagram illustrating an example of an internal functional configuration of a CPU of the RB of the present embodiment.

FIG. 3 is a block diagram illustrating an example of an internal functional configuration of the CPU 21 of the RB 3 of the present embodiment. The CPU 21 illustrated in FIG. 3 reads a communication control program stored in the ROM 18 and executes various processes as processing functions to be performed based on the communication control program. The CPU 21 includes a monitoring control unit 31, a transmission/reception unit 32, a TRILL control unit 33, a DCB control unit 34, and a CLI (Command Line Interface) control unit 35 as functional units.

The monitoring control unit 31 monitors a port state within the line interface 13 through the path switch 12 and notifies the TRILL control unit 33 of detection of change in the port state when the change in the port state is detected. Further, the monitoring control unit 31 controls an opening and closing of the port based on, for example, an instruction from the TRILL control unit 33.

The transmission/reception unit 32 transmits and receives the control frame to and from the RB 3 within the TRILL network 1A through the path switch 12, and notifies the TRILL control unit 33 of reception of the control frame when the control frame is received, and transmits the control frame according to the instruction from the TRILL control unit 33. In the meantime, the control frame includes, for example, a HELLO frame, an LSP (Link State PDU) frame, a CSNP (Complete Sequence Number PDU) frame, or a PSNP (Partial Sequence Number PDU) frame.

The HELLO frame is the control frame used for confirming the safety of the RB 3 by being periodically transmitted and received to and from a communication port to which broadcast is set by each RB 3. The LSP frame corresponds to a PDU with which each RB 3 reports a path distance to its own device, and is a control frame which is delivered to all RBs 3 within the TRILL network 1A to be used for calculating the same topology information by all RBs 3. The CSNP frame and the PSNP frame are the control frames used to secure a synchronization of link state information.

The TRILL control unit 33 controls various processings according to the TRIIL protocol. The DCB control unit 34 controls various processings according to the DCB protocol. Further, the memory 19 includes a network information DB 41, a priority table 42, a table per user 43, a table per path 44, and an ETS table 45. The network information DB 41 accumulates network information such as an adjacency relation between the RBs 3 or a path cost of the physical path.

Figure 4:
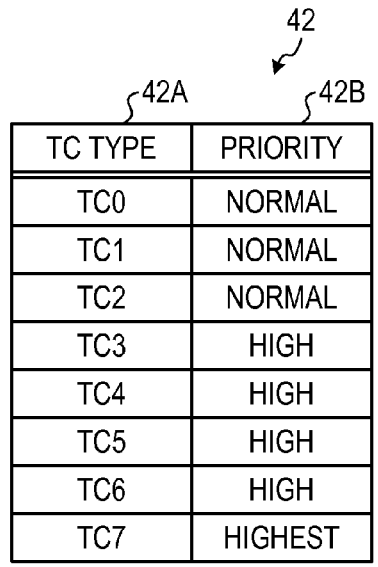
FIG. 4 is a diagram for explaining an example of a priority table.

FIG. 4 is a diagram for explaining an example of the priority table 42. The priority table 42 illustrated in FIG. 4 manages a priority 42B of a class group which classifies respective TCs for each TC type 42A. The TC type 42A corresponds to the types of TC and classifies the types of TC into, for example, eight types ranging from TC0 to TC7. The priority 42B classifies respective TCs into three class groups such as, for example, "Highest", "High", and "Normal" in the descending order of priority. TC0, TC1, and TC2 belong to, for example, a "Normal" class group and mainly target the LAN data traffic. TC3, TC4, TC5, and TC6 belong to, for example, a "High" class group and mainly target the storage I/O data traffic. TC7 belongs to, for example, a "Highest" class group and mainly targets the IPC data.

Figure 5:
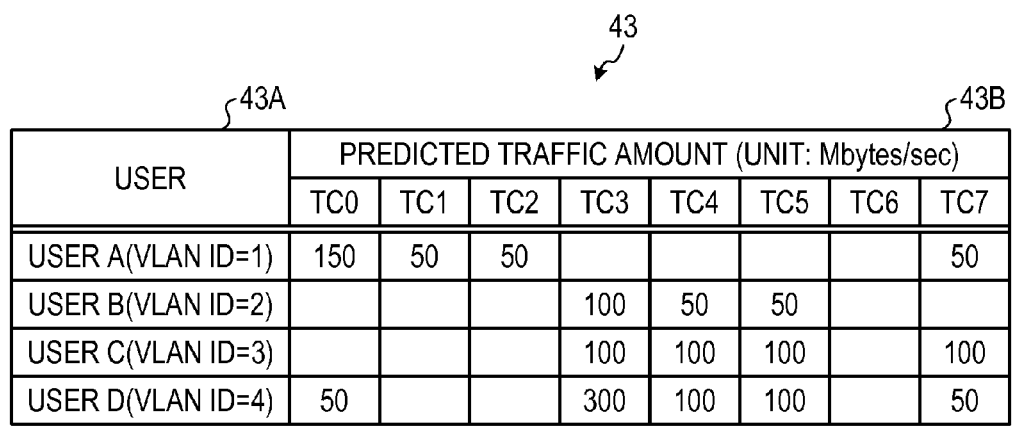
FIG. 5 is a diagram for explaining an example of a table per user.

FIG. 5 is a diagram for explaining an example of a table per user 43. The table per user 43 illustrated in FIG. 5 manages a predicted traffic amount 43B of each of TC0 to TC7 for each user 43A. The user 43A is an ID identifying a VLAN (Virtual Local Area Network). Further, the predicted traffic amount 43B is a predicted amount of each TC of the VLAN to be allocated to the physical path 4.

The DCB control unit 34 may refer to the table per user 43 illustrated in FIG. 5 to identify that regarding, for example, the user A, the predicted traffic amount of TC0 is 150 Mbytes/sec, the predicted traffic amount of TC1 is 50 Mbytes/sec, and the predicted traffic amount of TC7 is 50 Mbytes/sec.

FIG. 6A and FIG. 6B are diagrams for explaining an example of a table per path 44. The table per paths 44 illustrated in FIGS. 6A and 6B manage the predicted traffic amount 44B of each TC of each user 4A for each physical path 4. Further, the table per path 44 manages a total of predicted traffic amounts 44C of each TC and a total of predicted traffic amounts 44D of each user (VLAN). The table per path 44 illustrated in FIG. 6A manages the predicted traffic amount of each TC of, for example, a physical path 4A(4) between the terminating RB 3A and the relaying RB 3B. The table per path 44 illustrated in FIG. 6B manages the predicted traffic amount of each TC of, for example, a physical path 4B(4) between the terminating RB 3A and the relaying RB 3C.

The DCB control unit 34 may refer to the table per path 44 illustrated in FIG. 6A to identify the predicted traffic amount of each TC0 regarding, for example, the physical path 4A. The DCB control unit 34 may identify that the predicted traffic amount of TC0 is 150 Mbytes/sec, the predicted traffic amount of TC1 is 50 Mbytes/sec, the predicted traffic amount of TC2 is 50 Mbytes/sec, the predicted traffic amount of TC3 is 100 Mbytes/sec, and the predicted traffic amount of TC4 is 50 Mbytes/sec. Furthermore, the DCB control unit 34 may identify that the predicted traffic amount of TC5 is 50 Mbytes/sec, the predicted traffic amount of TC6 is 0 Mbytes/sec, and the predicted traffic amount of TC7 is 50 Mbytes/sec.

FIG. 7A and FIG. 7B are diagrams for explaining an example of an ETS table 45. The ETS tables 45 illustrated in FIGS. 7A and 7B manage an allocation ratio 45A of the bandwidth for each TC of the VLAN to be allocated to the physical path 4. The allocation ratio 45A is an allocation ratio of the minimum guaranteed bandwidth for each TC of an allocating target VLAN to an entire physical bandwidth of the physical path 4. The ETS table 45 illustrated in FIG. 7A manages the allocation ratio 45A of the bandwidth for each TC of the physical path 4A between the terminating RB 3A and the relaying RB 3B. The ETS table 45 illustrated in FIG. 7B manages the allocation ratio 45A of the bandwidth for each TC of the physical path 4B between the terminating RB 3A and the relaying RB 3C.

The DCB control unit 34 may refer to the ETS table 45 illustrated in FIG. 7A to identify that regarding the physical path 4A, the allocation ratios for TC0, TC1, TC2, TC3, TC4, TC5, TC6, and TC7 are 30%, 10%, 10%, 20%, 10%, 10%, 0%, and 10%, respectively.

The TRILL control unit 33 includes a state management unit 51, a protocol control unit 52, and a path determination unit 53. The state management unit 51 collects state information, such as for example, a port state or path cost of each RB 3 through the monitoring control unit 31, and manages the collected state information. When a change in the port state caused by, for example, a fault of the physical path 4 is detected through the monitoring control unit 31, the state management unit 51 notifies the protocol control unit 52 of the change in the state.

The protocol control unit 52 controls the entire TRILL control unit 33. The protocol control unit 52 exchanges the HELLO frame with other RB 3 through the transmission/reception unit 32 to learn the adjacency relationship autonomously. The protocol control unit 52 exchanges the control frame, such as the LSP, with other RB 3 through the transmission/reception unit 32 to collect network information such as the adjacency relationship of the RB 3 or the path cost of the physical path 4, and accumulates the collected network information in the network information DB 41.

Further, the TRILL is equipped with an ECMP (Equal Cost Multi Path) function which has an architecture to distribute and allocate redundant paths in traffic unit in a case where a plurality of redundant paths, each of which has the equal cost, exist between the terminating RBs 3A and 3F within the TRILL network 1A. In the meantime, since the distribution scheme of the ECMP function is not stipulated in the RFC, it is assumed that traffic is allocated to the redundant path in a VLAN unit from the viewpoint of Layer 2.

When the change in the port state caused by, for example, a fault of the physical path 4 is detected, the path determination unit 53 determines the physical path 4 to be allocated for each VLAN. The path determination unit 53 includes an allocation processing unit 53A, a port setting unit 53B, and a hardware setting unit 53C. The allocation processing unit 53A determines an output destination path to be allocated to each VLAN among the redundant physical paths 4 having the equal cost within the physical paths 4. The port setting unit 53B sets a communication port to which the VLAN is allocated after determining the output destination path to be allocated for the VLAN. The hardware setting unit 53C executes hardware processing of the output destination path side such as, for example, allocation processings for various processes such as, for example, a frame transfer rule at the time of allocating the VLAN to the output destination path.

The DCB control unit 34 includes an ETS setting unit 61 and a DCBX (Data Center Bridging exchange) communication unit 62. The ETS setting unit 61 includes a detection unit 71, a first calculation unit 72, an allocation unit 73, a second calculation unit 74, a setting unit 75, and a control unit 76. The detection unit 71 detects the change in the state of the physical path 4 from the protocol control unit 52 within the TRILL control unit 33. In the meantime, the change in the state of the physical path 4 includes the change in the state such as, for example, a change in an operation such as a switching to a redundant path by the TRILL protocol or reconstructing of the TRILL network 1A.

When the change in the state of the physical path 4 is detected, the first calculation unit 72 calculates a predicted traffic amount of each TC of an allocating target VLAN to be allocated to the physical path 4 based on, for example, statistical information. In the meantime, the allocating target VLAN corresponds to all VLANs to be allocated to the physical path 4. The first calculation unit 72 stores the predicted traffic amount of each TC of the VLAN in the table per user 43 and the table per path 44.

The allocation unit 73 allocates the predicted traffic amount of each TC to a surplus bandwidth within the physical path 4 based on the priority of each TC. In the meantime, TCs are classified into three class groups depending on the priority and the class groups are assigned with priorities such as, for example, "Highest", "High", and "Normal" in the descending order of priority. The surplus bandwidth is an unallocated empty bandwidth capable of being allocated among the entire physical bandwidth within the physical path 4. The second calculation unit 74 calculates the bandwidth allocation ratio for each TC to the entire physical bandwidth within the physical path 4 according to the predicted traffic amount of each TC allocated to the surplus bandwidth by the allocation unit 73 for each physical path 4.

The setting unit 75 stores the bandwidth allocation ratio for each TC of each physical path 4 calculated by the second calculation unit 74 in the ETS table 45. The control unit 76 sets the bandwidth allocation ratio for each TC which is set for each physical path 4 within the ETS table 45 in the port setting unit 53B and controls a flow rate of traffic which flows in the physical path 4 in TC unit according to the bandwidth allocation ratio for each TC.

The DCBX communication units 62 of the RBs 3 within the TRILL network 1 notify the control information about DCB between each other using the DCBX. The control information includes, for example, a PFC (Priority-based Flow Control), an ETS or a CN (Congestion Notification). The PFC is information to assign a priority to each traffic for the VLAN flowing in the same physical path 4 to logically separate links for each priority in order to avoid a frame loss caused by congestion. The PFC is used such that PAUSE is transmitted to only the traffic having the specific priority to make it possible to control the flow of each TC. The CN is information to adjust the amount of transmission in order not to cause occurrence of the frame loss in such a way that a reception port monitors a reception queue to notify a transmission port of congestion and shaping is performed by the transmission port side which has received notification of congestion occurrence. The DCBX is a protocol corresponding to 802.1AB (LLDP: Link Layer Discovery Protocol) extensions in order for the RBs 3 to detect and exchange link parameters used in the DCB between each other.

The DCBX communication unit 62 notifies each RB 3 within the TRILL network 1A of the bandwidth allocation ratio for each TC being set in the physical path 4, that is, the ETS setting contents. As a result, respective RBs 3 may share the bandwidth allocation ratio for each TC of the physical path 4, that is, updated ETS setting contents, within the TRILL network 1A. Also, each RB 3 sets, for example, reception parameters of the reception port according to the ETS setting contents.

The CLI control unit 35 is a control unit to allow various information within, for example, the priority table 42, the table per user 43, the table per path 44, and the ETS table 45 to be changed by setting manipulation of the user.

Figure 8A:
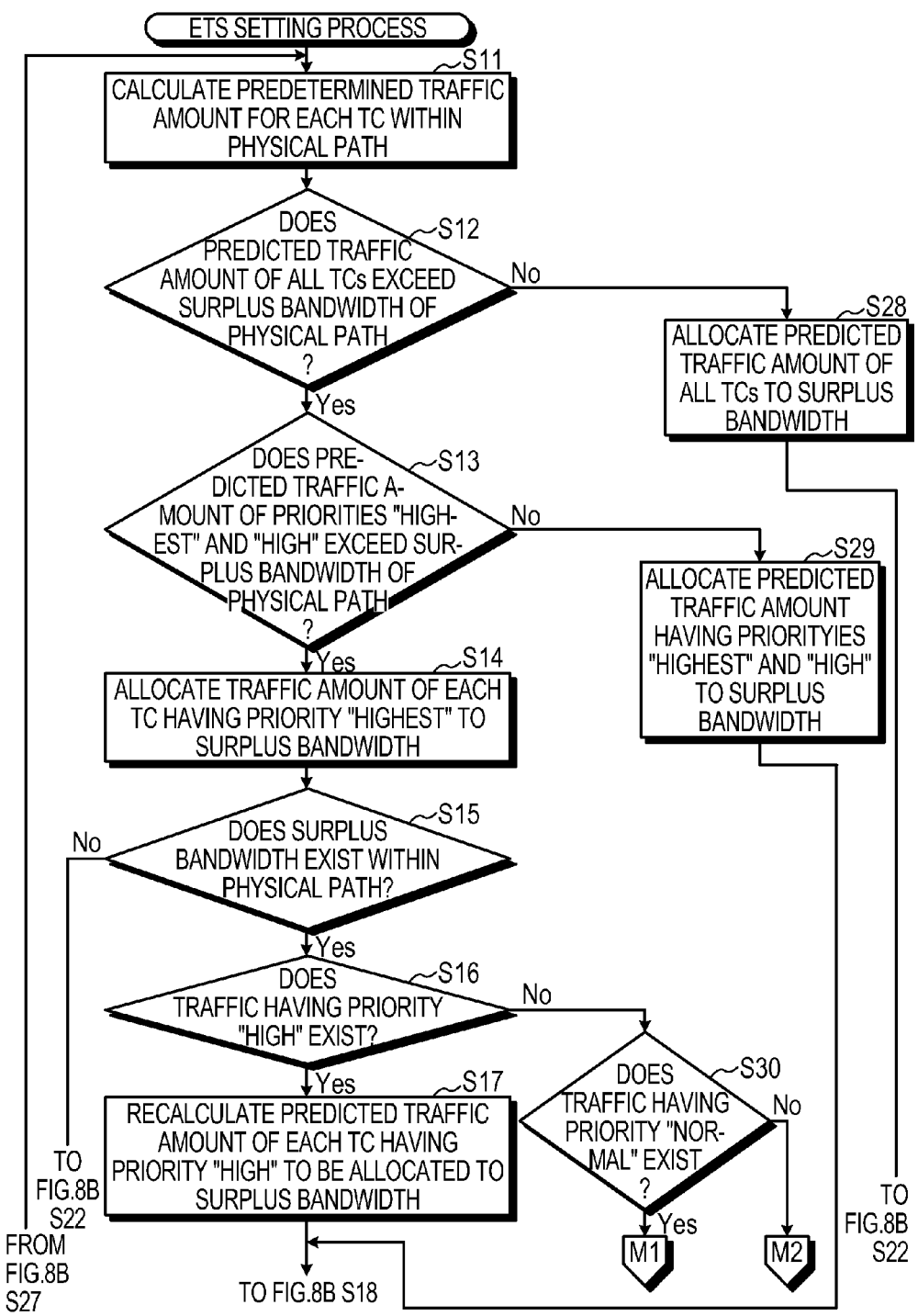

Subsequently, descriptions will be made on operations of the communication system 1 of the present embodiment. FIGS. 8A and 8B are a flowchart illustrating an example of processing operations of the DCB control unit 34 related to an ETS setting process. The ETS setting process illustrated in FIGS. 8A and 8B are, for example, a process of autonomously updating the ETS setting contents for the physical path 4 according to the change in the state of the physical path 4.

In FIGS. 8A and 8B, the first calculation unit 72 of the ETS setting unit 61 within the DCB control unit 34 calculates the predicted traffic amount for each TC of an allocating target VLAN to be allocated to the physical path 4 (Operation S11). In the meantime, the allocating target VLANs correspond to all VLANs to be allocated to the physical path 4. The allocation unit 73 of the ETS setting unit 61 determines whether the predicted traffic amounts of all TCs of the allocating target VLAN to be allocated to the physical path 4 exceeds the traffic amount corresponding to the surplus bandwidth of the physical path 4 (Operation S12). In the meantime, the surplus bandwidth is an empty bandwidth which amounts to the traffic amount capable of being allocated to the VLAN among the entire physical bandwidth of the physical path 4.

When it is determined that the predicted traffic amounts of all TCs exceeds the traffic amount which amounts to the surplus bandwidth of the physical path 4 ("YES" at Operation S12), the allocation unit 73 determines whether a total sum of predicted traffic amounts of all TCs of the class groups having the priorities of "Highest" and "High" exceeds the traffic amount which amounts to the surplus bandwidth (Operation S13). In the meantime, for example, the TC having the priority of "Highest" corresponds to TC7 and all TCs having the priority of "High" correspond to TC3, TC4, TC5, and TC6. The allocation unit 73 refers to the table per path 44 illustrated in FIG. 6 to acquire the predicted traffic amount of all TCs of the class groups having the priorities of "Highest" and "High".

When it is determined that the predicted traffic amount of all TCs of the class groups having the priorities of "Highest" and "High" exceeds the traffic amount which amounts to the surplus bandwidth ("YES" at Operation S13), the allocation unit 73 allocates a bandwidth which amounts to the predicted traffic amount of the TC having the priority of "Highest" to the surplus bandwidth (Operation S14).

The allocation unit 73 determines whether the surplus bandwidth exists in the physical path 4 (Operation S15). When it is determined that the surplus bandwidth exists in the physical path 4 ("YES" at Operation S15), the first calculation unit 72 determines whether the TC having the priority of "High" exists in the allocating target VLAN (Operation S16).

When it is determined that the TC having the priority of "High" exists in the allocating target VLAN ("YES" at Operation S16), the allocation unit 73 recalculates the predicted traffic amount of each TC having the priority of "High" to be allocated to the surplus bandwidth (Operation S17). In the meantime, the allocation unit 73 calculates the predicted traffic amount of each TC having the priority of "High" using a mathematical expression, that is, surplus bandwidth×(predicted traffic amount of corresponding TC÷total of predicted traffic amounts of all TCs having priority of "High").

The allocation unit 73 allocates the recalculated predicted traffic amount of each TC having the priority of "High" to the surplus bandwidth (Operation S18). The allocation unit 73 determines whether the surplus bandwidth exists within in the physical path 4 (Operation S19).

When it is determined that the surplus bandwidth exists within the physical path 4 ("YES" at Operation S19), the first calculation unit 72 recalculates the predicted traffic amount of each TC having the priority of "Normal" to be allocated to the surplus bandwidth (Operation S20). Further, respective TCs having the priority of "Normal" correspond to TC0, TC1, and TC2. The allocation unit 73 calculates the predicted traffic amount of each TC having the priority of "Normal" using a mathematical expression, that is, surplus bandwidth×(predicted traffic amount of corresponding TC÷total of predicted traffic amounts of all TCs having priority of "Normal"). Further, the allocation unit 73 allocates the recalculated predicted traffic amount of each TC having the priority of "High" to the surplus bandwidth (Operation S21).

The second calculation unit 74 calculates the bandwidth allocation ratio for each TC to the physical bandwidth of the physical path 4 according to the predicted traffic amount of each TC allocated to the physical bandwidth within the physical path 4 by the allocation unit 73 (Operation S22). The setting unit 75 stores the calculated bandwidth allocation ratio for each TC in the ETS table 45 (Operation S23). The control unit 76 sets the bandwidth allocation ratio for each TC of the ETS table 45 in the port setting unit 53B (Operation S24) and notifies each RB 3 within the TRILL network 1A of the bandwidth allocation ratio for each TC within the physical path 4 through the DCBX communication unit 62 (Operation S25). As a result, each RB 3 may update the bandwidth allocation ratio for each TC of each physical path 4 calculated by each RB 3 in the entire TRILL network 1A.

Further, the control unit 76 determines whether an unset physical path 4 exists (Operation S26). In the meantime, the unset physical path 4 corresponds to the physical path 4 for which the ETS setting contents is not yet updated among the physical paths 4 in which the change in the state is detected. When it is determined that the unset physical path 4 exists ("YES" at Operation S26), the control unit 76 selects the unset physical path 4 (Operation S27). The first calculation unit 72 proceeds to Operation S11 to calculate the predicted traffic amount for each TC of an allocating target VLAN within the physical path 4 after the unset physical path 4 is selected.

When it is determined that the predicted traffic amounts of all TCs within the physical path 4 does not exceed the traffic amount which amounts to the surplus bandwidth of the physical path 4 ("NO" at Operation S12), the allocation unit 73 allocates the predicted traffic amount of all TCs of the allocating target VLAN to the surplus bandwidth (Operation S28). Further, the allocation unit 73 proceeds to Operation S22 such that the bandwidth allocation ratio for each TC within the physical path 4 is calculated.

When it is determined that the total sum of the predicted traffic amounts of all TCs having the priorities of "Highest" and "High" does not exceed the traffic amount which amounts to the surplus bandwidth ("NO" at Operation S13), the allocation unit 73 allocates the predicted traffic amount of the TCs having the priorities of "Highest" and "High" to the surplus bandwidth (Operation S29). Further, the allocation unit 73 proceeds to Operation S19 to determine whether the surplus bandwidth exists within the physical path 4.

When it is determined that the surplus bandwidth does not exist in the physical path 4 ("NO" at Operation S15) or the surplus bandwidth does not exist within the physical path 4 ("NO" at Operation S19), the allocation unit 73 proceeds to Operation S22 to calculate the bandwidth allocation ratio for each TC allocated within the physical path 4.

When it is determined that the TC having the priority of "High" does not exist in the allocating target VLAN ("NO" at Operation S16), the allocation unit 73 determines whether the TC having the priority of "Normal" exists in the allocating target VLAN (Operation S30). When it is determined that the TC having the priority of "Normal" exists in the allocating target VLAN ("YES" at Operation S30), the allocation unit 73 proceeds to Operation S20 to recalculate the predicted traffic amount of the TC having the priority of "Normal" to be allocated to the surplus bandwidth.

When it is determined that the TC having the priority of "Normal" does not exist in the allocating target VLAN ("NO" at Operation S30), the allocation unit 73 proceeds to Operation S22 to calculate the bandwidth allocation ratio for each TC to the physical bandwidth.

The ETS setting unit 61 executing the ETS setting process illustrated in FIGS. 8A and 8B calculates the predicted traffic amount of each TC of the allocating target VLAN for each physical path 4. When the predicted traffic amount of respective TCs having the priorities of "Highest" and "High" exceeds the traffic amount which amounts to the surplus bandwidth, the ETS setting unit 61 allocates the predicted traffic amount of each TC having the priority of "Highest" to the surplus bandwidth. When the surplus bandwidth exists after the predicted traffic amount of each TC having the priority of "Highest" is allocated to the surplus bandwidth, the ETS setting unit 61 recalculates the predicted traffic amount of each TC having the priority of "High" to be allocated to the surplus bandwidth and then, allocates the recalculated predicted traffic amount of each TC having the priority of "High" to the surplus bandwidth. When the surplus bandwidth exists after the predicted traffic amount of each TC having the priority of "High" is allocated to the surplus bandwidth, the ETS setting unit 61 recalculates the predicted traffic amount of each TC having the priority of "Normal" to be allocated to the surplus bandwidth and then, allocates the recalculated predicted traffic amount of each TC having the priority of "Normal" to the surplus bandwidth. Also, the ETS setting unit 61 calculates the bandwidth allocation ratio for each TC according to the predicted traffic amount of each TC after being allocated and stores the calculated bandwidth allocation ratio for each TC in the ETS table 45. As a result, the ETS setting contents of the physical path 4 is autonomously updated according to the change in the state of the physical path 4 and thus, the lossless packet may be achieved by controlling the flow rate of the VLAN to be flowed in the physical path 4 according to the ETS setting contents.

When the surplus bandwidth does not exist after the predicted traffic amount of each TC having the priority of "High" is allocated to the surplus bandwidth, the ETS setting unit 61 calculates the bandwidth allocation ratio for each TC according to the predicted traffic amount of each TC after being allocated and stores the calculated bandwidth allocation ratio for each TC in the ETS table 45. As a result, the ETS setting contents of the physical path 4 is autonomously updated according to the change in the state of the physical path 4 and thus, the lossless packet may be achieved by controlling the flow rate of the VLAN to be flowed in the physical path 4 according to the ETS setting contents.

When the surplus bandwidth does not exist after the predicted traffic amount of each TC having the priority of "Highest" is allocated to the surplus bandwidth, the ETS setting unit 61 calculates the bandwidth allocation ratio for each TC according to the predicted traffic amount of each TC after being allocated and stores the calculated bandwidth allocation ratio for each TC in the ETS table 45. As a result, the ETS setting contents of the physical path 4 is autonomously updated according to the change in the state of the physical path 4 and thus, the lossless packet may be achieved by controlling the flow rate of the VLAN to be flowed in the physical path 4 according to the ETS setting contents.

When a total sum of predicted traffic amounts of all TCs of the allocating target VLAN does not exceed the traffic amount which amounts to the surplus bandwidth, the ETS setting unit 61 allocates the predicted traffic amount of all TCs to the surplus bandwidth. Also, the ETS setting unit 61 calculates the bandwidth allocation ratio for each TC according to the predicted traffic amount of each TC after being allocated and stores the calculated bandwidth allocation ratio for each TC in the ETS table 45. As a result, the ETS setting contents of the physical path 4 is autonomously updated according to the change in the state of the physical path 4 and thus, the lossless packet may be achieved by controlling the flow rate of the VLAN to be flowed in the physical path 4 according to the ETS setting contents.

In the meantime, in the ETS setting process illustrated in FIGS. 8A and 8B, it is determined whether the predicted traffic amount of respective TCs having the priorities of "Highest" and "High" exceeds the traffic amount which amounts to the surplus bandwidth at Operation S13. However, when the TC having the priority of "Highest" does not exist within an allocating target traffic, it is determined whether the predicted traffic amount of respective TCs having the priorities of "High" and "Normal" exceeds the traffic amount which amounts to the surplus bandwidth. Also, when the predicted traffic amount of respective TCs having the priorities of "High" and "Normal" exceeds the traffic amount which amounts to the surplus bandwidth, a bandwidth which amounts to the predicted traffic amount of each TC having the priority of "High" may be allocated to the surplus bandwidth at Operation S14.

Further, when the TC having the priority of "High" does not exist within the allocating target traffic, it may be determined whether the predicted traffic amount of respective TCs having the priorities of "Highest" and "Normal" exceeds the traffic amount which amounts to the surplus bandwidth at Operation S13.

Figure 9:
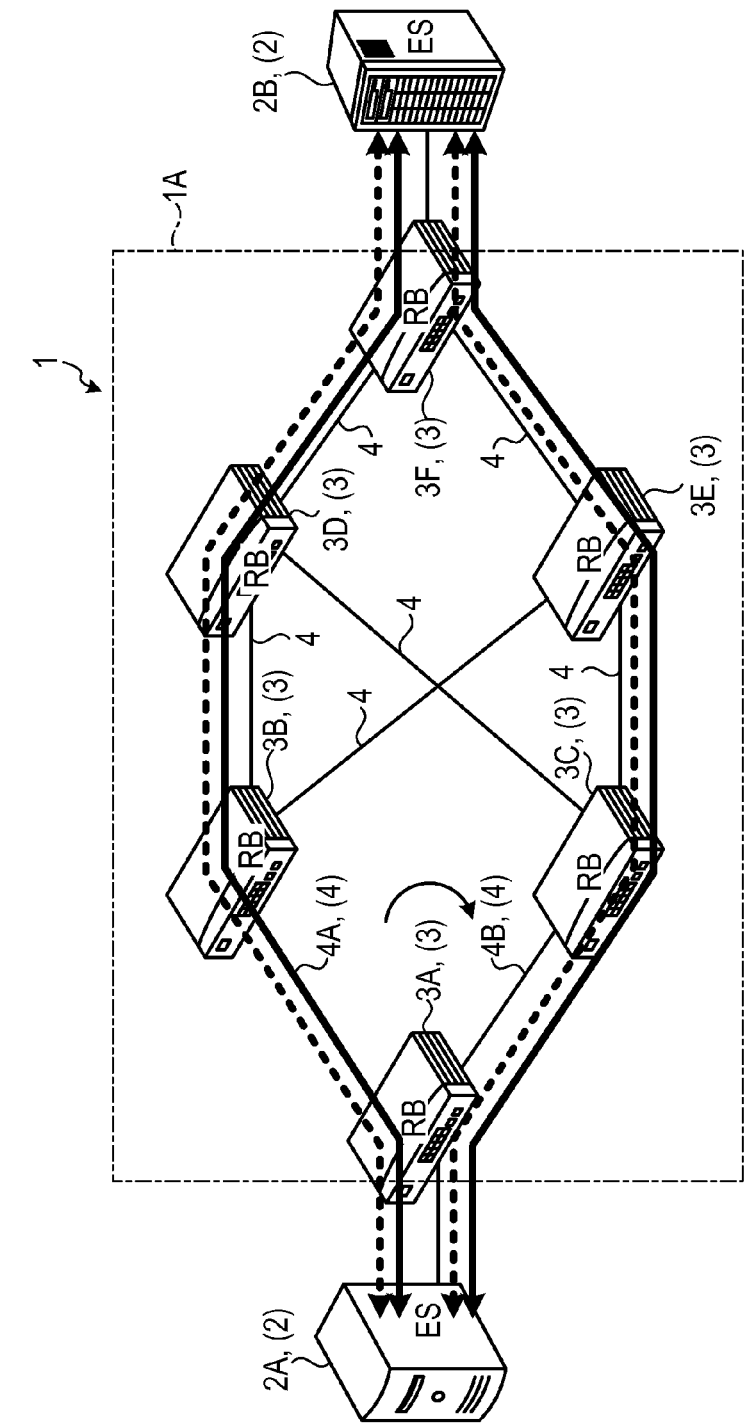
FIG. 9 is a diagram for explaining an example of a communication system when a path is switched.

FIG. 9 is a diagram for explaining an example of the communication system 1 when a path is switched. It is assumed that the terminating RB 3A sets VLANs of user A and user B in a physical path 4A established between the terminating RB 3A and the relaying RB 3B, and sets VLANs of user C and user D in a physical path 4B established between the terminating RB 3A and the relaying RB 3C. When a fault has occurred in the physical path 4A established between the terminating RB 3A and the relaying RB 3B, the terminating RB 3A within the TRILL network 1A autonomously switches the VLANs of the user A and user B to the physical path 4B established between the terminating RB 3A and the relaying RB 3C. That is, the terminating RB 3A sets the VLANs of the user A, user B, user C and user D in the physical path 4B established between the terminating RB 3A and the relaying RB 3C.

The detection unit 71 within the ETS setting unit 61 of the terminating RB 3A detects the change in the state of the physical paths 4A and 4B according to the switching from the physical path 4A to the physical path 4B. The first calculation unit 72 within the ETS setting unit 61 calculates the predicted traffic amount of each TC within the physical path 4B of a switching destination and stores the calculated predicted traffic amount of each TC in the table per path 44 as illustrated in FIG. 10.

FIG. 10 is a diagram for explaining an example of the table per user when a path is switched. In the meantime, the table per path 44 of FIG. 10 corresponds to the table per path 44 of the physical path 4B after the path is switched. The allocation unit 73 refers to the table per path 44 of FIG. 10 to identify the predicted traffic amount of each TC. The allocation unit 73 identifies that the predicted traffic amount of TC0 is 200 Mbytes/sec, 50 Mbytes/sec for TC1, 50 Mbytes/sec for TC2, 500 Mbytes/sec for TC3, 250 Mbytes/sec for TC4, 250 Mbytes/sec for TC5, 0 Mbytes/sec for TC6, and 200 Mbytes/sec for TC7.

The allocation unit 73 determines whether the predicted traffic amount of all TCs having the priorities of "Highest" and "High" exceeds the traffic amount which amounts to the surplus bandwidth. In the meantime, it is assumed that the predicted traffic amounts of all TCs having the priorities of "Highest" and "High" is set to 1200 Mbytes/sec which amounts to a total of the predicted traffic amounts of TC3, TC4, TC5, and TC7 as illustrated in FIG. 10. Further, the physical path 4B is assumed to be a 1 GB (1000 MB) line. When the predicted traffic amount (1200 Mbytes/sec) of all TCs having the priorities of "Highest" and "High" exceeds the traffic amount (1 Gbytes/sec) which amounts to the surplus bandwidth, the allocation unit 73 allocates the predicted traffic amount (200 Mbytes/sec) of TC7 having the priority of "Highest" to the surplus bandwidth. In the meantime, the surplus bandwidth becomes a bandwidth which amounts to the traffic amount of 800 Mbytes/sec calculated by subtracting 200 Mbytes from 1 Gbytes.

Further, the allocation unit 73 recalculates the predicted traffic amount of each TC having the priority of "High" to be allocated to the surplus bandwidth. The allocation unit 73 calculates the predicted traffic amount of each TC having the priority of "High" using a mathematical expression, that is, surplus bandwidth×(predicted traffic amount of corresponding TC÷total of predicted traffic amounts of all TCs having priority of "High"). The allocation unit 73 calculates 400 Mbytes/sec as the predicted traffic amount of TC3 having priority of "High" obtained with a mathematical expression, that is, 800 M×(500 M÷1000 M)=400 Mbytes/sec. Further, the allocation unit 73 calculates 200 Mbytes/sec as the predicted traffic amount of TC4 having priority of "High" obtained with a mathematical expression, that is, 800 M×(250 M÷1000 M)=200 Mbytes/sec. Further, the allocation unit 73 calculates 200 Mbytes/sec as the predicted traffic amount of TC5 having priority of "High" obtained with a mathematical expression, that is, 800 M×(250 M÷1000 M)=200 Mbytes/sec. The allocation unit 73 stores the predicted traffic amounts of all TCs having the priorities of "Highest" and "High" and is being allocated in the table illustrated in FIG. 11.

Also, the allocation unit 73 determines whether the surplus bandwidth exists within the physical path 4B after the predicted traffic amount of each TC having the priority of "High" is allocated to the surplus bandwidth. Since the surplus bandwidth does not exist within the physical path 4B, the second calculation unit 74 calculates the bandwidth allocation ratio for each TC after being allocated illustrated in FIG. 11. The second calculation unit 74 calculates the bandwidth allocation ratios for TC7, TC6, TC5, TC4, and TC3 having the priorities of "Highest" and "High". The second calculation unit 74 calculates the bandwidth allocation ratio for each TC within the physical path 4B. For example, the allocation ratio for TC7 is 20% which is calculated using a mathematical expression, that is, 200 M÷1000 M=20%, the allocation ratio for TC6 is 0% which is calculated using a mathematical expression, that is, 0 M÷1000 M=0%, and the allocation ratio for TC5 is 20% which is calculated using a mathematical expression, that is, 200 M÷1000 M=20%. Further, the second calculation unit 74 calculates the allocation ratio for TC4 as 20% obtained with a mathematical expression, that is, 200 M÷1000 M=20% and the allocation ratio for TC3 as 40% obtained using a mathematical expression, that is, 400 M÷1000 M=40%. Also, the bandwidth allocation ratio for each TC of the physical path 4B becomes the ETS setting contents of the physical path 4B after the path is switched.

Figure 12:
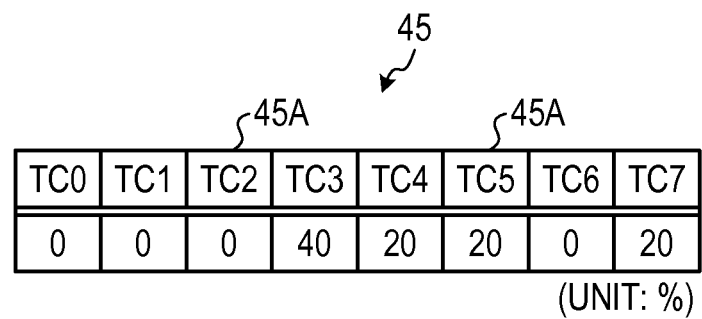
FIG. 12 is a diagram for explaining an example of the ETS table when a path is switched.

Also, the setting unit 75 stores the bandwidth allocation ratio for each TC within the physical path 4B calculated in the second calculation unit 74 as illustrated in FIG. 12. The control unit 76 controls the flow rate of the VLAN flowing into the physical path 4B within the ETS table 45 in TC unit according to the ETS setting contents of the physical path 4B within the ETS table 45. As a result, even when the physical path 4B is switched within the TRILL network 1A, the lossless packet of packets having a higher priority may be achieved by updating the bandwidth allocation ratio for each TC, that is, by updating the ETS setting contents according to an allocation situation of the VLAN after the physical path 4B is switched.

When the change in the state of the physical path 4 is detected, the RB 3 of the embodiment described above calculates the predicted traffic amount of each TC of the allocating target VLAN to be allocated to the physical path 4 for each physical path 4 of which state is changed. Further, the RB 3 calculates the bandwidth allocation ratio for each TC to the physical bandwidth of the physical path 4 according to the calculated predicted traffic amount of each TC for each physical path 4. Further, the RB 3 sets the allocation ratio (ETS) of the bandwidth for each TC for each physical path 4 and controls the flow rate of the allocating target VLAN to be flowed to the physical path 4 in TC unit according to the bandwidth allocation ratio for each TC set for each physical path 4. As a result, even when the state of the physical path 4 is changed, the bandwidth allocation ratio for each TC of the allocating target VLAN is updated according to the change in the state of each physical path 4 and thus, the lossless packet of the higher priority packets of the VLAN which flows in the physical path 4 may be achieved.

For example, even when the path is switched from an active path where a fault has occurred to a redundant path using the TRILL protocol, the ETS setting contents of the redundant path is updated according to the change in the predicted traffic amount of each TC after being switched within the redundant path. Also, it is possible to achieve the packet lossless which makes an amount of discarded packets of the VLAN which flows in the redundant path smaller according to the ETS setting contents of the redundant path after being switched, that is, the bandwidth allocation ratio for each TC. Furthermore, since the ETS setting contents are autonomously updated according to the allocation condition of the VLAN after being switched, a manipulation burden on the user side may be reduced.

When the predicted traffic amounts of all TCs to be allocated to the physical path 4 exceeds the traffic amount which amounts to the surplus bandwidth, the RB 3 preferentially allocates the surplus bandwidth for the predicted traffic amount of each TC within the class group having a higher priority. As a result, even when the predicted traffic amount of the allocating target VLAN exceeds the traffic amount which amounts to the surplus bandwidth, the predicted traffic amount is allocated to the surplus bandwidth sequentially from the TC of the class group having the highest priority, for example, "Highest", "High", and "Normal" in the descending order of priority. The surplus bandwidth is preferentially allocated for the TC, for example, storage I/O having a higher priority, for which the packet lossless is required.

When the surplus bandwidth is allocated for the predicted traffic amount of each TC within the unallocated class group having a higher priority, the RB 3 recalculates the predicted traffic amounts of each TC within the class group. As a result, an optimum predicted traffic amount of each TC of the class group having the higher priority allocated to the surplus bandwidth may be acquired.

When the surplus bandwidth of the physical path 4 exists after the surplus bandwidth is allocated to the predicted traffic amount of each TC within the unallocated class group, the RB 3 allocates the surplus bandwidth for the predicted traffic amount of each TC within the class group having the higher priority among the unallocated class groups. As a result, the predicted traffic amount is allocated to the surplus bandwidth sequentially from the TC of the class group having the highest priority, for example, "Highest", "High", and "Normal" in the descending order of priority.

When a bandwidth allocation ratio for each TC is set for each physical path 4, the RB 3 notifies each RB 3 within the TRILL network 1A of the allocation ratio (ETS setting contents) of the bandwidth for each TC of the physical path 4 using the DCBX. As a result, each RB 3 within the TRILL network 1A may update the ETS setting contents in the entire TRILL network 1A.

In the embodiment described above, for example, TCs ranging from TC0 to TC7 are classified into three class groups having the priorities of "Highest", "High", and "Normal", but the number of classified class groups is not limited to three. Further, the TRILL network 1A of the embodiment is constituted by, for example, six RBs 3, but the number of RBs is not limited to six.

Further, respective constitutional elements of respective units illustrated are not necessarily configured to be physically the same as those illustrated. That is, a specific shape of distribution and integration of the respective units is not limited to a shape illustrated and all or some of the units may be configured to be functionally and physically distributed and integrated in any unit according to various loads or use situation.

Further, all or some of various processing functions performed by each device may be executed on a CPU (Central Processing Unit) (or a micro-computer such as an MPU (Micro Processing Unit) or an MCU (Micro Controller Unit)). Further, all or some of various processing functions may also be performed on program interpreted and executed by the CPU (or a micro-computer such as the MPU or the MCU) or hardware by a wired-logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus operable in a communication network implementing a Layer 2 redundancy protocol, the communication apparatus comprising:
   a memory storing information; and
   a processor configured to cause the following operations to be performed in accordance with the information stored in the memory:
   calculating a predicted amount of traffic to be allocated to a physical path for each of classes prioritized with predefined priorities within the traffic when a change in a port state of the physical path within the redundancy protocol is detected,
   calculating a bandwidth allocation ratio to a physical bandwidth of the physical path, for each of the classes to be allocated for the physical path according to the calculated predicted amount of traffic for each of the classes,
   setting the calculated bandwidth allocation ratio for each of the classes, and
   controlling a flow rate of the traffic for each of the classes to be flowed in the physical path according to the set bandwidth allocation ratio for each of the classes.

2. The communication apparatus according to claim 1, wherein the processor is configured to cause the following operations to be performed:
   allocating, to a surplus bandwidth of the physical path, the predicted amount of traffic for each of classes within a class group having a highest priority among unallocated class groups when the calculated predicted amount of traffic of all classes exceeds an amount of traffic that amounts to the surplus bandwidth of the physical path.

3. The communication apparatus according to claim 2, wherein the processor is configured to cause the following operations to be performed:
   calculating the predicted amount of traffic for each of classes within the class group allocated to the surplus bandwidth when the predicted amount of traffic for each of classes within the class group having the highest priority among unallocated class groups is allocated to the surplus bandwidth of the physical path.

4. The communication apparatus according to claim 3, wherein the processor is configured to cause the following operations to be performed:

allocating, to the surplus bandwidth of the physical path, the predicted amount of traffic for each of classes within the class group having a high priority among the unallocated class groups when the surplus bandwidth exists in the physical path after the predicted amount of traffic for each of classes within the unallocated class group is allocated to the surplus bandwidth of the physical path.

5. The communication apparatus according to claim 1, wherein the processor is configured to cause the following operations to be performed:

notifying other communication apparatus within the communication network of the bandwidth allocation ratio for each of the classes when the bandwidth allocation ratio for each of the classes is set by the setting.

6. A communication method by a communication apparatus operable in a communication network implementing a Layer 2 redundancy protocol, the communication method comprising:

calculating a predicted amount of traffic to be allocated to a physical path for each of classes prioritized with predefined priorities within the traffic when a change in a port state of the physical path within the redundancy protocol is detected;

calculating a bandwidth allocation ratio to a physical bandwidth of the physical path, for each of the classes to be allocated for the physical path according to the calculated predicted amount of traffic for each of the classes;

setting the calculated bandwidth allocation ratio for each of the classes; and controlling a flow rate of the traffic for each of the classes to be flowed in the physical path according to the set bandwidth allocation ratio for each of the classes.

7. A communication apparatus operable in a communication network implementing a Layer 2 redundancy protocol, the communication apparatus comprising:

means for storing data including a network information and a priority table;

means for calculating a predicted amount of traffic to be allocated to a physical path for each of classes prioritized with predefined priorities stored in the means for storing within the traffic when a change in a port state of the physical path within the redundancy protocol is detected;

means for calculating a bandwidth allocation ratio to a physical bandwidth of the physical path, for each of the classes to be allocated for the physical path according to the calculated predicted amount of traffic for each of the classes;

means for setting the calculated bandwidth allocation ratio for each of the classes; and means for controlling a flow rate of the traffic for each of the classes to be flowed in the physical path according to the set bandwidth allocation ratio for each of the classes.

* * * * *